March 19, 1935.  O. I. LARSEN  1,994,480
METHOD OF MAKING UNIVERSAL JOINT YOKES
Filed March 20, 1933
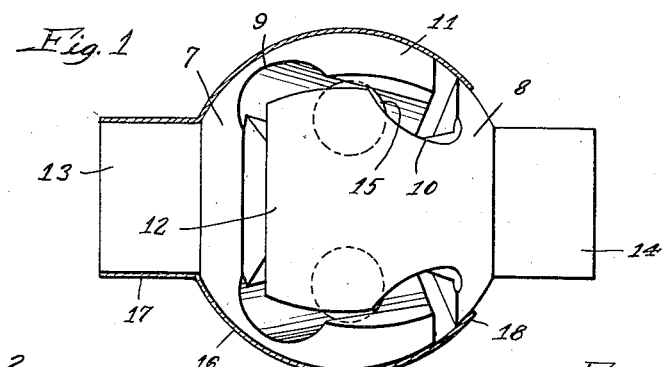
Fig. 1
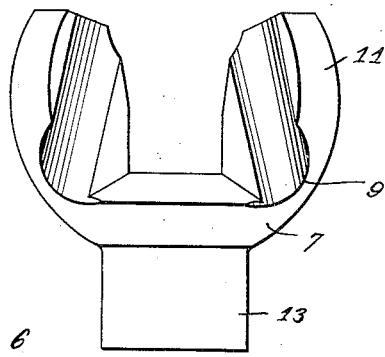
Fig. 2
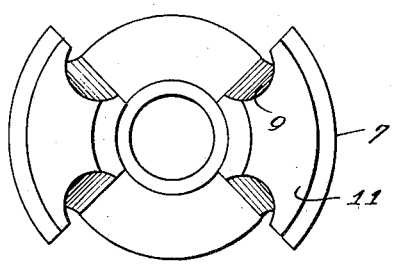
Fig. 3
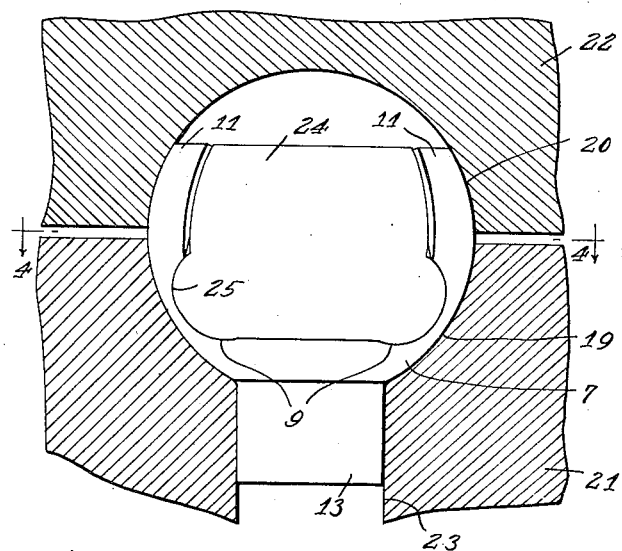
Fig. 6
Fig. 5
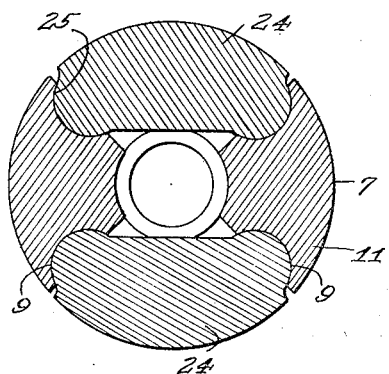
Fig. 4
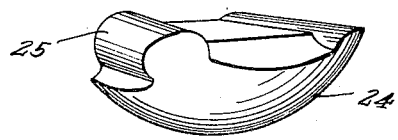
Inventor:
Othmar I. Larsen
By Wilson, Dowell,
McCanna & Wintercorn
Attys.

Patented Mar. 19, 1935

1,994,480

UNITED STATES PATENT OFFICE 1,994,480

METHOD OF MAKING UNIVERSAL JOINT YOKES

Othmar I. Larsen, Winnetka, Ill.

Application March 20, 1933, Serial No. 661,834

20 Claims. (Cl. 29—148)

This invention relates to a new and improved method of making yokes for universal joints of the general type disclosed in Weiss Patent 1,522,351, issued January 6, 1925, namely, one in which the two interfitting yoke members have balls fitting in intersecting grooves formed in the coacting proximate faces of the yoke members, and in which the yoke members have their outer surfaces together forming a portion of a sphere, so as to work inside and be retained in operative relationship to one another within a housing conformed thereto.

Universal joints of the kind mentioned have presented difficult problems in the matter of the manufacture of the yoke members. The production of these parts by conventional methods involved prohibitive cost, especially where it was attempted to work to the close limits of accuracy desired. It is, therefore, the principal object of my invention to provide a new and more partical method of manufacture in accordance with which the forged yokes after they have been machined completely and carburized, are subjected to a coin press operation for sizing and truing up before hardening, thereby making it possible to produce these parts to a close degree of accuracy hitherto considered impossible for quantity production and at a fraction of the cost otherwise involved.

In the following description, reference is made to the accompanying drawing, in which—

Figure 1 is a view of a Weiss universal joint, showing the joint proper in side elevation and its sheet metal housing in section;

Fig. 2 is a side view of one of the yoke members of the joint;

Fig. 3 is an end view of the yoke;

Fig. 4 is a cross-section on the line 4—4 of Fig. 6 showing filler blocks like the one appearing in perspective in Fig. 5 inserted in the grooves in the arms of the yoke, and Fig. 6 is a section through coin press dies showing a yoke with filler blocks therein being subjected to pressure for sizing and truing up.

The same reference numerals are applied to corresponding parts throughout the views.

The universal joint may be of any form in which the yoke members 7 and 8 have straight grooves, and the grooves may be parallel to the axis of rotation of the individual yoke member or inclined at an angle with respect thereto. The grooves 9 and 10 herein shown are inclined at an angle to the axis of the shanks 13 and 14, respectively, the four grooves 9 on the arms 11 of the yoke 7 converging to a point on the axis remote from the shank 13 and the four grooves 10 on the arms 12 of the yoke 8 being similarly disposed with relation to the shank 14. The grooves, being straight, may be machined straight through with a milling cutter. The yokes have the arms 11 and 12 interfitted, as shown. Four balls 15 disposed in the cooperating grooves 9 and 10 of the two yokes, assume the torque in the transmission of power from the one shank to the other and permit angular displacement of one yoke relative to the other. The external surface of that portion of each yoke beyond the shank thereof is spheroidal. When the yokes are assembled together, these portions, therefore, very nearly approximate a complete sphere and work inside a housing 16 conformed thereto. The one shown is of sheet metal and has a tubular shank 17 having a press fit on the shank 13 of the yoke 7. The mouth portion 18 of the housing is pressed to the form shown over the yoke 8 after assembly, leaving an opening at the mouth portion large enough to permit a predetermined amount of angular displacement of the yokes with respect to one another while retaining the yokes in assembled relation.

In the manufacture of the yokes 7 and 8, the grooves 9 and 10 are machined entirely across the faces of the arms 11 and 12, as clearly appears in Fig. 2. The yokes, to begin with, are forged, of course, for the requisite toughness. Following the complete machining, the yokes are carburized so as to give a case thereon that will have the desired hardness when the yoke is subsequently hardened, whereby to make for durability particularly in the grooves where the principal wear will occur. Now, if conventional methods were to be followed in the manufacture of these yokes, it would consist in grinding the grooves after the hardening. However, that means expense and inability to work to very close limits in quantity production. In accordance with my invention, I contemplate subjecting the yokes, after the carburizing and prior to hardening, to a coin press operation, so as to size and true up the yokes and eliminate the necessity for finish grinding. In that way, I not only make an appreciable saving in the cost of manufacture but produce yokes to closer limits of accuracy. The accuracy obtained is superior to what was secured with the more expensive method of grinding after hardening; the distortion due to carburizing is removed in the coin press operation.

The coin press operation is performed, as shown in Fig. 6, with the yoke fitting in spheroidal depressions 19 and 20 of companion die blocks 21 and 22, the shank being accommodated in a pilot bearing 23 provided in one of said blocks on a true radius with respect to the spheroidal depression in said block. Filler blocks 24 fill in the spaces between the arms of the yoke and have ribs 25 on the opposed longitudinal edges thereof made to fit in a specified sized groove to which the grooves 9 and 10 are to be made to conform. The filler blocks are, of course, hardened so as to be harder than the steel of the carburized or carburized and hardened yoke when placed in the coin press, in order that the metal of the yoke may be displaced when the die blocks are brought together, and thus remove irregularities as to size and shape that may exist in the yoke. The outside surface of the filler blocks is spheroidal and conforms to the spheroidal surfaces of the arms of the yoke. In that way, when the yoke with its filler blocks assembled thereon, as shown in Fig. 6, is disposed between the die blocks of the coin press, it is manifest that the spheroidal depressions will be filled except for whatever irregularities as to size and shape may occur in the yoke, which may or may not be responsible for the one or the other or both of the filler blocks projecting out of alignment with the arms of the yoke, depending on the nature and extent of the irregularity. The irregularity will, of course, be kept within some specified limits of accuracy for the practical carrying out of my invention, whatever will be consistent with keeping the cost of manufacture to a minimum. The bringing together of the die blocks under heavy pressure, such as is obtainable in a coin press, results in movement of the filler blocks in the grooves and relative to the yoke arms, thus accurately sizing and truing up the yoke in a fraction of the time that would be required to grind the part accurately to size, and, of course, at a small fraction of the expense, not to mention the fact that the resulting product will be to a closer limit of accuracy than it would be possible to produce the same under the limitations otherwise imposed in quantity production.

While I have disclosed my invention as applied to the production of universal joint yokes of a specific type, it should be understood that the invention is not limited to this particular work but may be used wherever similar problems in production are, or have been, presented. The appended claims have accordingly been drawn to cover all legitimate modifications and adaptations.

I claim:

1. The method of making a universal joint yoke of a form comprising a shank and a plurality of integral spaced arms projecting therefrom, the method consisting in machining the yoke to completion and approximate size to a given tolerance, then carburizing the same, and then subjecting the same to a coin press operation for sizing and truing up to substantially exact size, that is, a closer tolerance.

2. The method of making a universal joint yoke of a form comprising a shank and a plurality of integral spaced arms projecting therefrom, the method consisting in machining the yoke to completion and approximate size to a given tolerance, then carburizing the same, then, before hardening subjecting the same to a coin press operation for sizing and truing up to substantially exact size, that is, a closer tolerance, and, finally, hardening the same.

3. The method of making a universal yoke of a form comprising a shank and a plurality of integral spaced arms projecting therefrom having grooves extending across the side faces of said arms, the method consisting in machining the yoke to completion and approximate size to a given tolerance, then carburizing the same, then inserting filler blocks of a predetermined size and shape filling in the spaces between the arms and entering the grooves, and then subjecting the yoke with the filler blocks assembled thereon to a coin press operation for sizing and truing up to substantially exact size, that is, a closer tolerance.

4. The method of making a universal joint yoke of a form comprising a shank and a plurality of integral spaced arms projecting therefrom having grooves extending across the side faces of said arms, the method consisting in machining the yoke to completion and approximate size to a given tolerance, then carburizing the same, then inserting filler blocks of a predetermined size and shape filling in the spaces between the arms and entering the grooves, then, before hardening, subjecting the yoke with the filler blocks assembled thereon to a coin press operation for sizing and truing up to substantially exact size, that is, a closer tolerance, and, finally, hardening the same.

5. The method of making a universal joint yoke of a form comprising a shank and a plurality of integral spaced arms projecting therefrom, the method consisting in machining the yoke to completion and approximate size to a given tolerance, then carburizing the same, then inserting filler blocks of a predetermined size and shape filling in the spaces between the arms, and then subjecting the yoke with the filler blocks assembled thereon to a coin press operation for sizing and truing up to substantially exact size, that is, to a closer tolerance.

6. The method of making a universal joint yoke of a form comprising a shank and a plurality of integral spaced arms projecting therefrom, the method consisting in machining the yoke to completion and approximate size to a given tolerance, then carburizing the same, then inserting filler blocks of a predetermined size and shape filling in the spaces between the arms, then, before hardening, subjecting the yoke with the filler blocks assembled thereon to a coin press operation for sizing and truing up to substantially exact size, that is, to a closer tolerance, and, finally, hardening the same.

7. The method of making a grooved metal part, without grinding, which consists in machining the part to completion with one or more grooves therein to a given tolerance, then carburizing the same, and then subjecting the same to a coin press operation in which a filler block conformed to the groove is moved in the groove under pressure for sizing and truing up to a closer tolerance.

8. The method of making a grooved metal part, without grinding, which consists in machaning the part to completion with one or more grooves therein to a given tolerance, then carburizing the same, then, before hardening subjecting the same to a coin press operation in which a filler block conformed to the groove is moved in the groove under pressure for sizing and truing up to a closer tolerance, and, finally, hardening the same.

9. The method of making a bored metal part, without grinding, which consists in machining the part to completion with one or more bores therein to a given tolerance, then carburizing the same, and then subjecting the same to a coin press operation in which a filler block conformed to the bore is moved in the bore under the pressure for sizing and truing up to a closer tolerance.

10. The method of making a bored metal part, without grinding, which consists in machining the part to completion with one or more bores therein to a given tolerance, then carburizing the same, then, before hardening, subjecting the same to a coin press operation in which a filler block conformed to the bore is moved in and the bore under pressure for sizing and truing up to a closer tolerance, and, finally, hardening the same.

11. The method of making a universal joint yoke of a form comprising a shank and a plurality of integrally spaced arms projecting therefrom, the method consisting in machining the yoke substantially to completion, then carburizing the same, and then subjecting the same to a coin press operation to remove distortion.

12. The method of making a universal joint yoke of a form comprising a shank and a plurality of integrally spaced arms projecting therefrom, the method consisting in machining the yoke substantially to completion, then carburizing the same, then, before hardening, subjecting the same to a coin press operation to remove distortion, and, finally, hardening the same.

13. The method of making a universal joint yoke of a form comprising a shank and a plurality of integrally spaced arms projecting therefrom having grooves provided therein, the method consisting in machining the yoke substantially to completion, then carburizing the same, then inserting filler blocks fitting in the grooves, and then subjecting the yoke with the filler blocks therein to a coin press operation to remove distortion.

14. The method of making a universal joint yoke of a form comprising a shank and a plurality of integrally spaced arms projecting therefrom having grooves provided therein, the method consisting in machining the yoke substantially to completion, then carburizing the same, then inserting filler blocks fitting in the grooves, then, before hardening, subjecting the yoke with the filler blocks therein to a coin press operation to remove distortion, and, finally, hardening the same.

15. The method of making a universal joint yoke of a form comprising a shank, and a plurality of integrally spaced arms projecting therefrom, the method consisting in machining the yoke substantially to completion, then carburizing the same, then inserting filler blocks filling the spaces between the arms, and then subjecting the yoke with the filler blocks therein to a coin press operation to remove distortion.

16. The method of making a universal joint yoke of a form comprising a shank, and a plurality of integrally spaced arms projecting therefrom, the method consisting in machining the yoke substantially to completion, then carburizing the same, then inserting filler blocks filling the spaces between the arms, then, before hardening, subjecting the yoke with the filler blocks therein to a coin press operation to remove distortion, and, finally, hardening the same.

17. The method of producing a finished metal part which consists in machining the same substantially to completion, then carburizing the same, and then subjecting the same to a coin press operation to remove distortion.

18. The method of producing a finished metal part which consists in machining the same substantially to completion, then carburizing the same, then, before hardening, subjecting the same to a coin press operation to remove distortion, and, finally, hardening the same.

19. The method of making a bored metal part which consists in machining the part substantially to completion with one or more bores therein, then carburizing the same, and then subjecting the same to a coin press operation in which a filler block conformed to the bore is moved in the bore under pressure to remove distortion.

20. The method of making a bored metal part which consists in machining the part substantially to completion with one or more bores therein, then carburizing the same, then, before hardening, subjecting the same to a coin press operation in which a filler block conformed to the bore is moved in the bore under pressure to remove distortion, and, finally, hardening the same.

OTHMAR I. LARSEN.

CERTIFICATE OF CORRECTION.

Patent No. 1,994,480.  March 19, 1935.

OTHMAR I. LARSEN.

It is hereby certified that error appears in the printed specification of the above numbered patent requiring correction as follows: Page 2, second column, line 64, claim 8, for the syllable "chaning" read chining; page 3, first column, line 3, strike out "the" third occurrence; and line 11, claim 10, strike out the word "and"; and that the said Letters Patent should be read with these corrections therein that the same may conform to the record of the case in the Patent Office.

Signed and sealed this 23rd day of April, A. D. 1935.

Leslie Frazer (Seal)   Acting Commissioner of Patents.